Feb. 11, 1958  O. L. LAGERVALL  2,823,050
ADAPTOR-RING ASSEMBLY FOR PIPE-TO-PLATE JOINT
Original Filed March 31, 1950
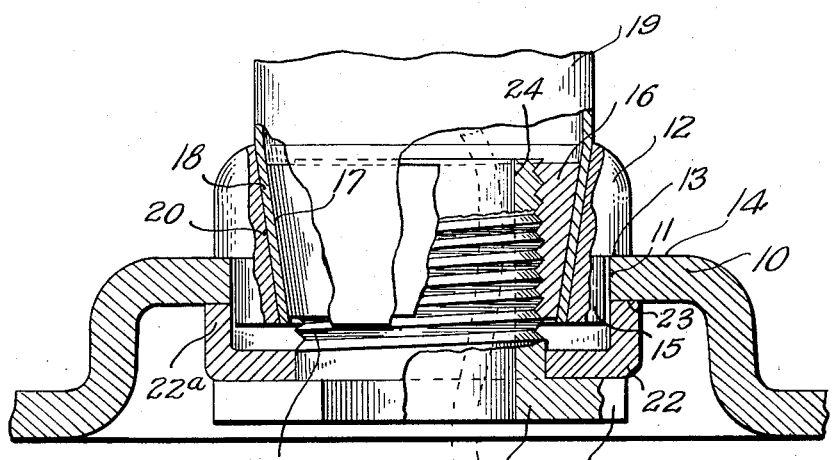
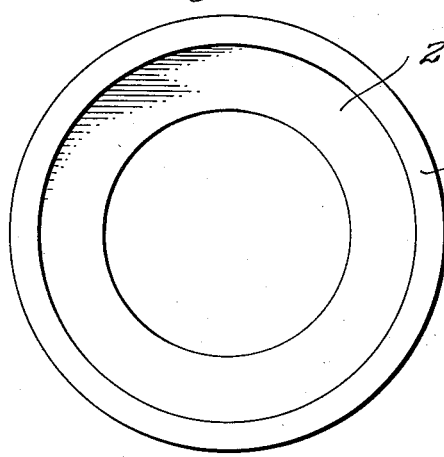
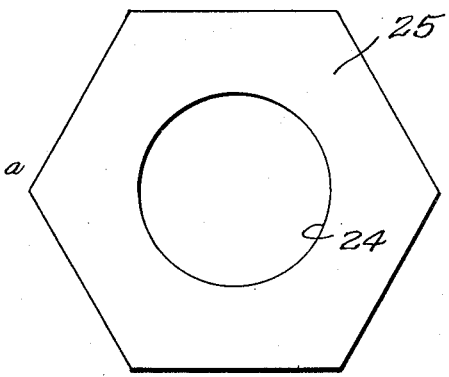
INVENTOR
OTTO L. LAGERVALL
BY
HIS ATTORNEY

United States Patent Office 2,823,050
Patented Feb. 11, 1958

2,823,050

ADAPTOR-RING ASSEMBLY FOR PIPE-TO-PLATE JOINT

Otto L. Lagervall, Yakima, Wash.

Original application March 31, 1950, Serial No. 153,215, now Patent No. 2,710,761, dated June 14, 1955. Divided and this application January 25, 1955, Serial No. 484,021

1 Claim. (Cl. 285—159)

This invention relates to an adaptor-ring assembly and has for one of its objects the production of a simple and efficient means for holding thin-walled tubes to bases, or other flat surfaces, without the necessity for cutting threads in the tubes, the present application constituting a divisional application of my patent issued June 14, 1955, #2,710,761, relating to an adaptor ring.

A further objects of this invention is the production of an adaptor-ring assembly which is so constructed as to permit the passing of a cable or the like, through a hollow pull-down bolt and a wedge nut which secure a tube or pipe to an apertured plate or base.

Other objects and advantages of the invention will appear throughout the following specification and claim.

In the drawing:

Figure 1 is a vertical sectional view of the adaptor, certain parts being shown in elevation;

Figure 2 is a top plan view of the cup-washer;

Figure 3 is a bottom plan view of the hollow pull-down bolt.

By referring to the drawing in detail, it will be seen that 10 designates a base or support having a suitable aperture 11. An adaptor ring 12 is carried by the base or support 10 and is provided with an abutment shoulder 13 which fits snugly against a face 14 of the base or support 10, and overhangs the aperture 11, as shown in Figure 1. The ring 12 is provided with an inset annular depending portion 15 which fits into the aperture 11. An internally threaded filler plug or wedge nut 16 having a tapering outer wall or face 17 fits snugly within a tapered end 18 of a thin-walled pipe 19. The tapered end 18 fits snugly against a tapering wall 20 of the ring 12.

A hollow pull-down bolt 21 extends through a rigid, hard-metal, shallow, flat-body cup-washer 22, which washer is provided with a right-angular inturned flange 22ª, which flange encases the annular depending portion 15 and abuts an inset face 23 of the base or support 10 defining a socket adjacent the aperture 11 thereof. The bolt 21 fits wholly within said socket to shield the bolt 21 against injury from foreign objects. The bolt 21 is provided with a hollow body portion 24, as shown in Figure 1, and is also provided with a suitable head 25, which head abuts the washer 22 and overhangs the inturned flange 22ª. The hollow bolt 21 is provided with external threads 26 which engage the threads of the internally threaded filler plug or wedge nut 16. The hollow pull-down bolt 21 is provided with the hollow body portion 24 to permit electric cables to be inserted up through the tube 19, for use with lamps, etc.

As the bolt 21 is tightened, the tapered end 18 of the tube 19 will be tightly drawn down into the tapering aperture 20 of the adaptor ring 12, and the head 25 of the pull-down bolt 21 will be firmly clamped against the washer 22. The washer 22 will in turn be firmly clamped against the inset face 23 of the base or support 10.

It will be obvious by considering Figure 1, that a rigid clamping action is produced between the cup-shaped washer 22 and the ring 12 against the base or support 10 as the bolt 21 is tightened in position to lock the tube 19 between the ring 12 and the filler plug or nut 16.

Having described the invention, what is claimed as new is:

A device of the class described comprising a flat support having an inset face defining a socket, said inset face having an aperture; an adaptor ring having a portion thereof fitting in said aperture, said ring having a flat abutment shoulder abutting said support adjacent said aperture, a thin-walled tube having a tapered end fitting in said ring; a tapering and internally threaded filler plug fitting in said tapered end of the tube for firmly holding said tapered end of said tube in engagement with said ring, said ring encircling said tapered end of said tube and filler plug; a hard-metal cup-washer having a flat support-contacting periphery contacting the opposite face of said support with respect to said ring, said contacting periphery surrounding said aperture, the cup-washer comprising a flat body spaced from said ring and filler plug and having an inwardly turned right-angular flange which provides said flat support-contacting periphery; and a threaded bolt engaging said filler plug and having a head abutting said body of said washer and overhanging said inwardly turned flange to apply pressure directly over said flange and for clamping the flange directly against said support and fastening said ring and washer in clamping engagement with said inset face, said head of said threaded bolt being wholly inset within said socket to thereby shield said threaded bolt against injury from foreign objects.

References Cited in the file of this patent

UNITED STATES PATENTS

| | | |
|---|---|---|
| 511,359 | Ragoncy | Dec. 26, 1893 |
| 587,546 | Dillenburg | Aug. 3, 1897 |
| 1,102,079 | Rizer | June 30, 1914 |
| 1,696,861 | Plimpton | Dec. 25, 1928 |
| 2,065,902 | Levin | Dec. 29, 1936 |